(12) United States Patent
Johnston

(10) Patent No.: US 11,105,206 B1
(45) Date of Patent: Aug. 31, 2021

(54) TURBINE AIRFOIL

(71) Applicant: United Technologies Corporation, Farmington, CT (US)

(72) Inventor: Remington Stewart Johnston, Vernon, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 17 days.

(21) Appl. No.: 16/523,694

(22) Filed: Jul. 26, 2019

(51) Int. Cl.
*F01D 5/14* (2006.01)
*F04D 29/38* (2006.01)

(52) U.S. Cl.
CPC .......... *F01D 5/141* (2013.01); *F04D 29/384* (2013.01); *F05D 2220/32* (2013.01); *F05D 2240/24* (2013.01); *F05D 2250/71* (2013.01)

(58) Field of Classification Search
CPC ................................ F01D 5/141; F04D 29/384
See application file for complete search history.

(56) References Cited

U.S. PATENT DOCUMENTS

| | | | | |
|---|---|---|---|---|
| 6,832,897 B2* | 12/2004 | Urban | ...................... | F01D 5/225 416/223 A |
| 7,581,930 B2* | 9/2009 | Aggarwala | ............. | F01D 5/141 416/193 A |
| 8,602,740 B2* | 12/2013 | O'Hearn | ................. | F01D 9/041 416/223 A |
| 8,997,494 B2* | 4/2015 | Chuang | ................... | F01D 5/141 60/726 |
| 9,115,588 B2* | 8/2015 | Nash | ....................... | F01D 5/141 |
| 9,133,713 B2* | 9/2015 | Allen-Bradley | ........ | F01D 5/141 |
| 10,012,086 B2* | 7/2018 | Pons | ....................... | F01D 5/141 |
| 10,041,503 B2* | 8/2018 | McKeever | ............... | F02C 3/04 |
| 10,066,641 B2* | 9/2018 | Modachur Krishnan | .................... | F04D 29/384 |
| 10,190,421 B2* | 1/2019 | Ristau | ..................... | F01D 5/187 |
| 10,480,323 B2* | 11/2019 | Balzer | .................... | F01D 5/141 |
| 2008/0063531 A1* | 3/2008 | Sreekanth | ............... | F01D 5/141 416/223 A |
| 2008/0101959 A1* | 5/2008 | McRae | ................... | F01D 5/141 416/223 R |
| 2013/0136611 A1* | 5/2013 | Gustafson | .............. | F01D 5/141 416/223 A |
| 2014/0311149 A1* | 10/2014 | Chuang | ................. | F04D 29/384 60/726 |
| 2016/0298470 A1* | 10/2016 | Fukuda | .................. | F01D 9/041 |
| 2017/0198586 A1* | 7/2017 | Balzer | .................... | F01D 5/141 |

* cited by examiner

*Primary Examiner* — Woody A Lee, Jr.
*Assistant Examiner* — Behnoush Haghighian
(74) *Attorney, Agent, or Firm* — Cantor Colburn LLP

(57) ABSTRACT

A turbine blade for a gas turbine engine, the turbine blade having: an airfoil including leading and trailing edges joined by spaced apart pressure and suction sides to provide an exterior airfoil surface extending from a platform in a radial direction to a tip; and wherein the exterior airfoil surface is formed in substantial conformance with multiple cross-sectional profiles of the airfoil described by a set of Cartesian coordinates set forth in at least one of Tables 1-3, and wherein the set of Cartesian coordinates in Tables 1-3 are offset from a center point of an inner diameter edge of a forward root face of a root of the turbine blade by offsets of Table 4 to provide the exterior airfoil surface at a span location.

12 Claims, 5 Drawing Sheets

TURBINE AIRFOIL

BACKGROUND

This disclosure relates to a gas turbine engine, and more particularly to an airfoil that may be incorporated into a gas turbine engine.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

In turbine blade design, there is an emphasis on stress-resistant airfoil and platform designs, with reduced losses, increased lift and turning efficiency, and improved turbine performance and service life. To achieve these results, non-linear flow analyses and complex strain modeling are required, making practical results difficult to predict. Blade loading considerations also impose substantial design limitations, which cannot easily be generalized from one system to another.

BRIEF DESCRIPTION

Disclosed is a turbine blade for a gas turbine engine, the turbine blade having: an airfoil including leading and trailing edges joined by spaced apart pressure and suction sides to provide an exterior airfoil surface extending from a platform in a radial direction to a tip; and wherein the exterior airfoil surface is formed in substantial conformance with multiple cross-sectional profiles of the airfoil described by a set of Cartesian coordinates set forth in at least one of Tables 1-3, and wherein the set of Cartesian coordinates in Tables 1-3 are offset from a center point of an inner diameter edge of a forward root face of a root of the turbine blade by offsets of Table 4 to provide the exterior airfoil surface at a span location.

In addition to one or more of the features described above, or as an alternative to any of the foregoing embodiments, the set of Cartesian coordinates in Tables 1-3 have a tolerance relative to the specified coordinates of ±0.020 inches (±0.508 mm).

In addition to one or more of the features described above, or as an alternative to any of the foregoing embodiments, the turbine blade includes a root, wherein the platform, the root, and the airfoil are cast as a single part.

In addition to one or more of the features described above, or as an alternative to any of the foregoing embodiments, the exterior airfoil surface is formed in substantial conformance with the multiple cross-sectional profiles of the airfoil described by the set of Cartesian coordinates set forth in Tables 1 and 2.

In addition to one or more of the features described above, or as an alternative to any of the foregoing embodiments, the exterior airfoil surface is formed in substantial conformance with the multiple cross-sectional profiles of the airfoil described by the set of Cartesian coordinates set forth in Tables 1 and 3.

In addition to one or more of the features described above, or as an alternative to any of the foregoing embodiments, the exterior airfoil surface is formed in substantial conformance with the multiple cross-sectional profiles of the airfoil described by the set of Cartesian coordinates set forth in Tables 2 and 3.

In addition to one or more of the features described above, or as an alternative to any of the foregoing embodiments, the exterior airfoil surface is formed in substantial conformance with the multiple cross-sectional profiles of the airfoil described by the set of Cartesian coordinates set forth in Tables 1-3.

Also disclosed is a turbine rotor assembly for a gas turbine engine, the turbine rotor assembly includes: a rotor disk; a plurality of turbine blades secured to the rotor disk, each of the plurality of turbine blades having an airfoil including leading and trailing edges joined by spaced apart pressure and suction sides to provide an exterior airfoil surface extending from a platform in a radial direction to a tip; and wherein the exterior airfoil surface is formed in substantial conformance with multiple cross-sectional profiles of the airfoil described by a set of Cartesian coordinates set forth in at least one of Tables 1-3, and wherein the set of Cartesian coordinates in Tables 1-3 are offset from a center point of an inner diameter edge of a forward root face of a root of the turbine blade by offsets of Table 4 to provide the exterior airfoil surface at a span location.

In addition to one or more of the features described above, or as an alternative to any of the foregoing embodiments, the set of Cartesian coordinates in Tables 1-3 have a tolerance relative to the specified coordinates of ±0.020 inches (±0.508 mm).

In addition to one or more of the features described above, or as an alternative to any of the foregoing embodiments, each of the plurality of turbine blades further include a root, wherein the platform, the root, and the airfoil are cast as a single part.

In addition to one or more of the features described above, or as an alternative to any of the foregoing embodiments, each of the plurality of turbine blades further comprise a root, wherein the platform, the root, and the airfoil are cast as a single part.

In addition to one or more of the features described above, or as an alternative to any of the foregoing embodiments, the exterior airfoil surface is formed in substantial conformance with the multiple cross-sectional profiles of the airfoil described by the set of Cartesian coordinates set forth in Tables 1-3.

Also disclosed is a gas turbine engine, the gas turbine engine having: a compressor section; a combustor fluidly connected to the compressor section; a turbine section fluidly connected to the combustor, the turbine section including: a high pressure turbine coupled to a high pressure compressor of the compressor section via a shaft; a low pressure turbine; and wherein the high pressure turbine includes a turbine rotor assembly comprising; a rotor disk; a plurality of turbine blades secured to the rotor disk, each of the plurality of turbine blades having an airfoil including leading and trailing edges joined by spaced apart pressure and suction sides to provide an exterior airfoil surface extending from a platform in a radial direction to a tip; and wherein the exterior airfoil surface is formed in substantial conformance with multiple cross-sectional profiles of the airfoil described by a set of Cartesian coordinates set forth in at least one of Tables 1-3 and wherein the set of Cartesian coordinates in Tables 1-3 are offset from a center point of an inner diameter edge of a forward root face of a root of the turbine blade by offsets of Table 4 to provide the exterior airfoil surface at a span location.

In addition to one or more of the features described above, or as an alternative to any of the foregoing embodiments, the set of Cartesian coordinates in Tables 1-3 have a tolerance relative to the specified coordinates of ±0.020 inches (±0.508 mm).

In addition to one or more of the features described above, or as an alternative to any of the foregoing embodiments, each of the plurality of turbine blades further comprise a root, wherein the platform, the root, and the airfoil are cast as a single part.

In addition to one or more of the features described above, or as an alternative to any of the foregoing embodiments, the exterior airfoil surface is formed in substantial conformance with the multiple cross-sectional profiles of the airfoil described by the set of Cartesian coordinates set forth in Tables 1-3.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Figure 1:
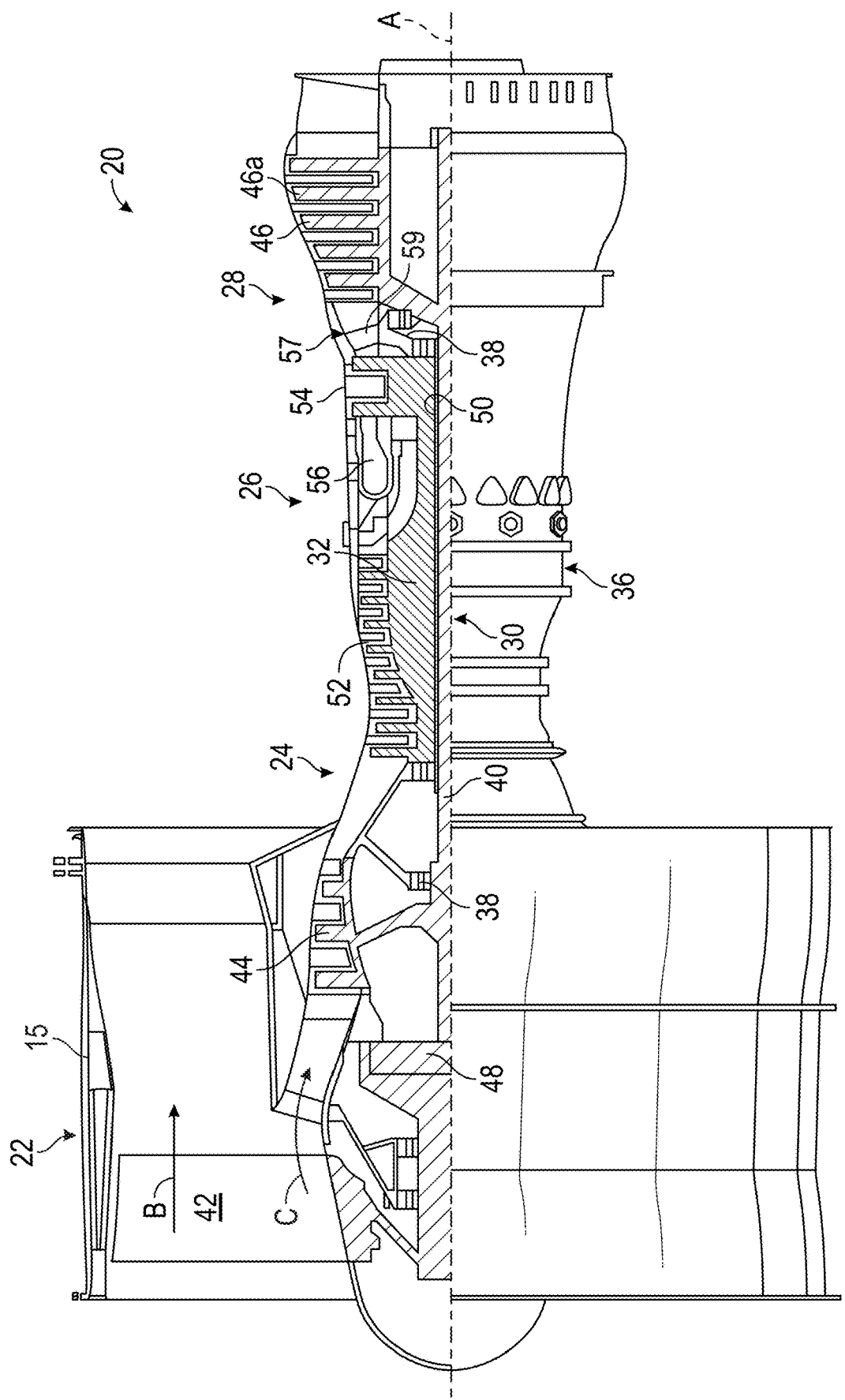
FIG. 1 is a schematic, partial cross-sectional view of a gas turbine engine in accordance with this disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first or low pressure compressor 44 and a first or low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second or high pressure compressor 52 and a second or high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{R})/(518.7° \text{R})]^{0.5}$. The "Low corrected fan tip speed" as disclosed herein according to one non-limiting embodiment is less than about 1150 ft/second (350.5 m/sec).

In a further example, the fan 42 includes less than about 26 fan blades. In another non-limiting embodiment, the fan 42 includes less than about 20 fan blades. Moreover, in one further embodiment the low pressure turbine 46 includes no more than about 6 turbine rotors schematically indicated at 46a. In a further non-limiting example the low pressure turbine 46 includes about 3 turbine rotors. A ratio between the number of blades of the fan 42 and the number of low pressure turbine rotors 46a is between about 3.3 and about 8.6. The example low pressure turbine 46 provides the driving power to rotate the fan section 22 and therefore the relationship between the number of turbine rotors 46a in the low pressure turbine 46 and the number of blades in the fan section 22 discloses an example gas turbine engine 20 with increased power transfer efficiency.

Figure 2:
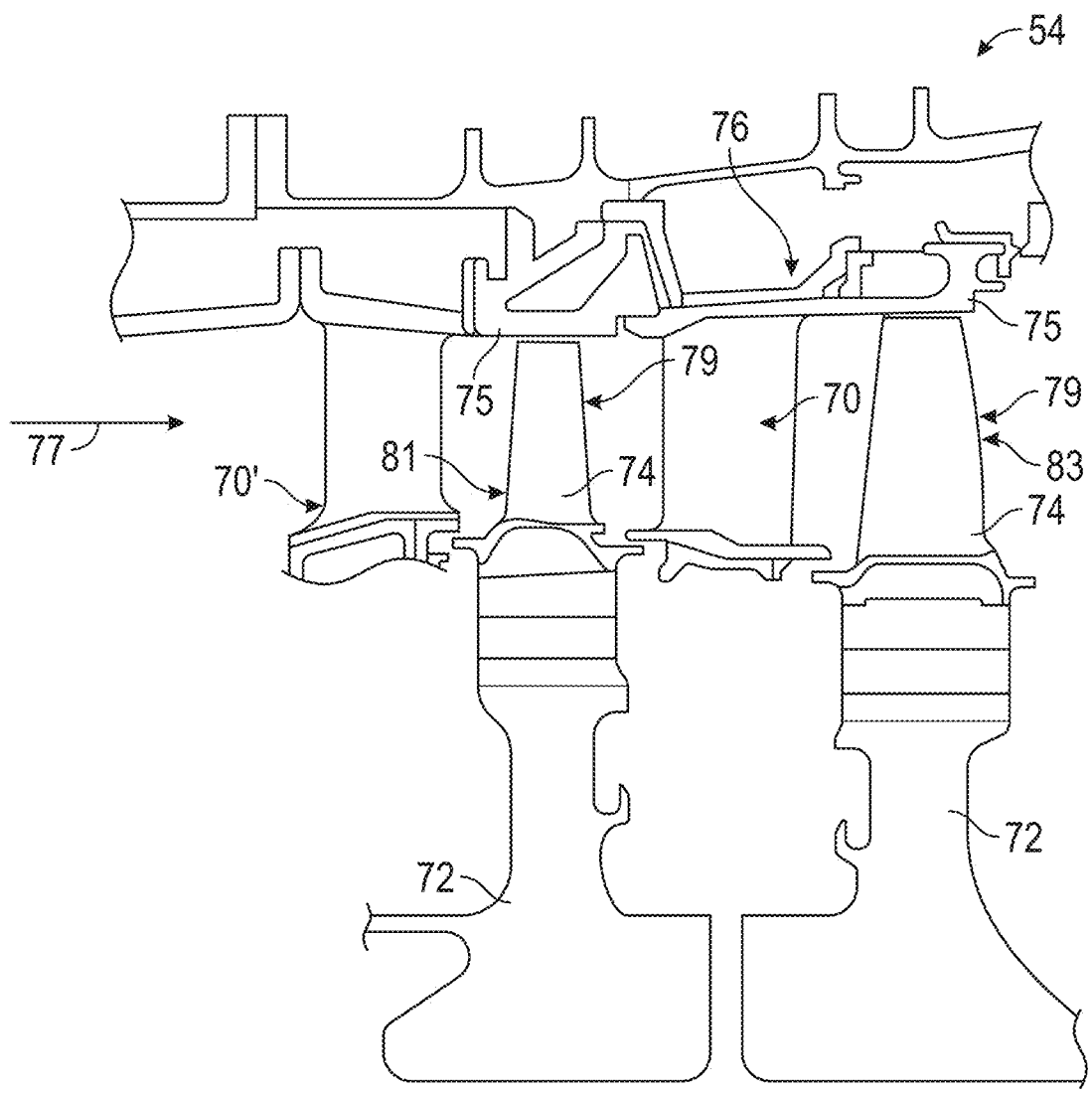
FIG. 2 is a schematic view of a two-stage high pressure turbine of the gas turbine engine.

FIG. 2 illustrates a portion of the high pressure turbine (HPT) 54. FIG. 2 also illustrates a high pressure turbine stage vanes 70 one of which (e.g., a first stage vane 70') is located forward of a first one of a pair of turbine disks 72 each having a plurality of turbine blades 74 secured thereto. The turbine blades 74 rotate proximate to blade outer air seals (BOAS) 75 which are located aft of the vane 70 or first stage vane 70'. The other vane 70 is located between the pair of turbine disks 72. This vane 70 may be referred to as the second stage vane. As used herein the first stage vane 70' is the first vane of the high pressure turbine section 54 that is located aft of the combustor section 26 and the second stage vane 70 is located aft of the first stage vane 70' and is located between the pair of turbine disks 72. In addition, blade outer air seals (BOAS) 75 are disposed between the first stage vane 70' and the second stage vane 70. The high pressure turbine stage vane 70 (e.g., second stage vane) or first stage vane 70' is one of a plurality of vanes 70 that are positioned circumferentially about the axis A of the engine in order to provide a stator assembly 76. Hot gases from the combustor section 26 flow through the turbine in the direction of arrow 77. Although a two-stage high pressure turbine is illustrated other high pressure turbines are considered to be within the scope of various embodiments of the present disclosure.

The high pressure turbine (HPT) is subjected to gas temperatures well above the yield capability of its material. In order to mitigate such high temperature detrimental effects, surface film-cooling is typically used to cool the blades and vanes of the high pressure turbine. Surface film-cooling is achieved by supplying cooling air from the cold backside through cooling holes drilled on the high pressure turbine components. Cooling holes are strategically designed and placed on the vane and turbine components in-order to maximize the cooling effectiveness and minimize the efficiency penalty.

Referring now to at least FIGS. 1-5, a turbine blade 74 is illustrated. As mentioned above, turbine blades 74 are secured to a turbine disk 72 that is configured to rotate about axis A. The turbine disk 72 and its turbine blades 74 may be referred to as a turbine rotor assembly 79. The turbine blades 74 and their associated disks 72 are located behind or downstream from either the first stage vane 70' or the second stage vane 70. The turbine blades located behind the first stage vane 70' and in front of the second stage vane 70 may be referred to first stage turbine blades 81 and the turbine blades 74 located behind the second stage vane 70 may be referred to second stage turbine blades 83. The turbine disk 72 and its turbine blades 74 may be referred to as a turbine rotor assembly 79, which depending on its location (e.g., located behind or downstream from either the first stage vane 70' or the second stage vane 70) the turbine rotor assembly may be referred to as a first stage turbine rotor assembly (behind or downstream from the first stage vanes 70' and before or upstream from the second stage vanes 70) or as a second stage turbine rotor assembly (behind or downstream from the second stage vanes 70 and behind or downstream, from the first stage turbine rotor assembly) of a high pressure turbine of the gas turbine engine.

Each turbine blade 74 has an airfoil 80 that extends radially from a platform 82. When the turbine blade 74 is secured to the turbine disk 72 and the disk 72 is secured to the engine 20, the airfoil 80 is further away from axis A than the platform 82. In other words, the airfoil 80 extends radially away from the platform 82 such that the airfoil 80 is at a further radial distance from the axis A than the platform 82. The surface of the platform 82 that is radially further away from axis A is contoured to minimize aerodynamic losses and may be referred at as the contoured end wall 85.

The airfoil 80 has a leading edge 84 and a trailing edge 86. In addition, the airfoil 80 may be provided with an internal cavity or cavities (not shown) that is/are in fluid communication with a source of cooling air or fluid. The airfoil 80 may have a plurality of cooling openings or film cooling holes (not shown) that are in fluid communication with the internal cavity in order to provide a source of cooling fluid or air to portions of the airfoil 80 such that film cooling can be provided in desired locations.

The airfoil 80 has a pressure side 90 and a suction side 92 each of which extends between the leading edge 84 and the trailing edge 86. The airfoil also terminates at a tip 94 that is furthest radially from the platform 82. Also shown in at least FIG. 3, is a root, root tree or root portion 96. Root, root tree or root portion 96 is used to secure the turbine blade 74 to the turbine disk 72. In one embodiment, the airfoil 80 may be integrally formed or cast with the platform 82 and/or the root portion 96. In other words, the turbine blade 74 including the airfoil 80, the platform 82 and the root 96 may be cast as a single part.

Figure 3A:
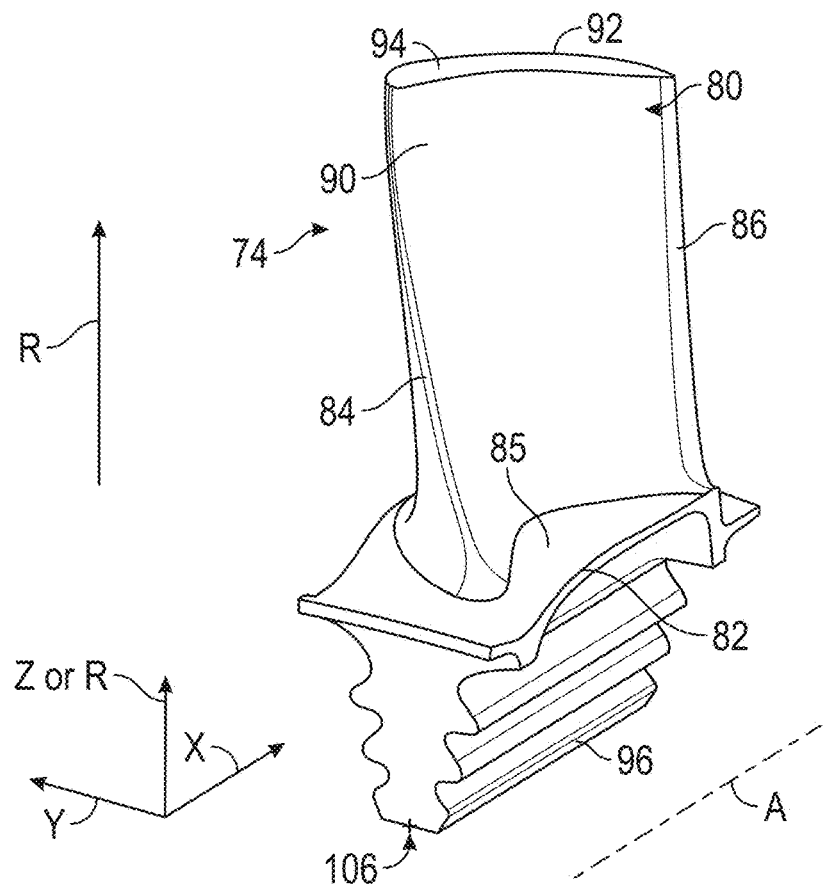
FIG. 3A is perspective view of a turbine blade according to an embodiment of the present disclosure.
Figure 3B:
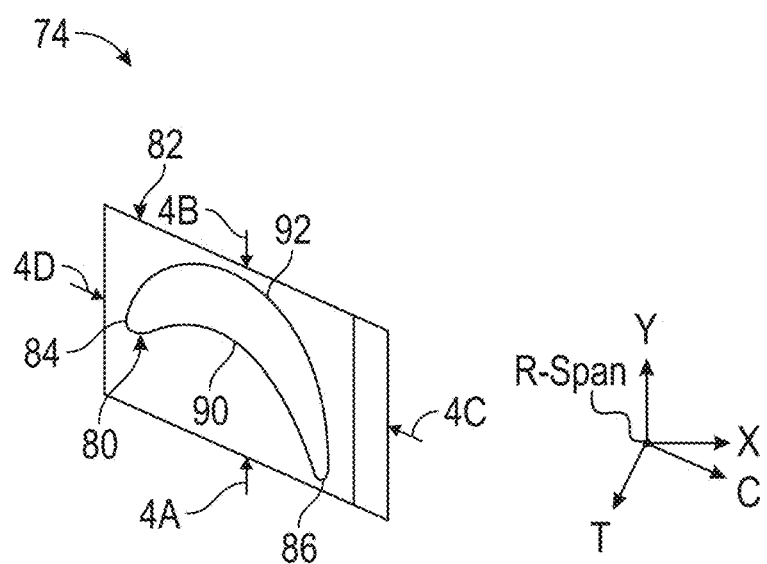
FIG. 3B is a plan view of the turbine blade of FIG. 3A illustrating directional references.
Figure 4A:
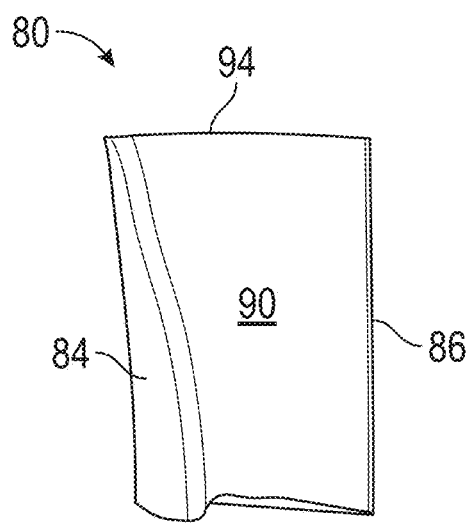
FIGS. 4A-4D illustrate different views of an airfoil of the turbine blade when viewed from the directions indicated in FIG. 3B.
Figure 4B:
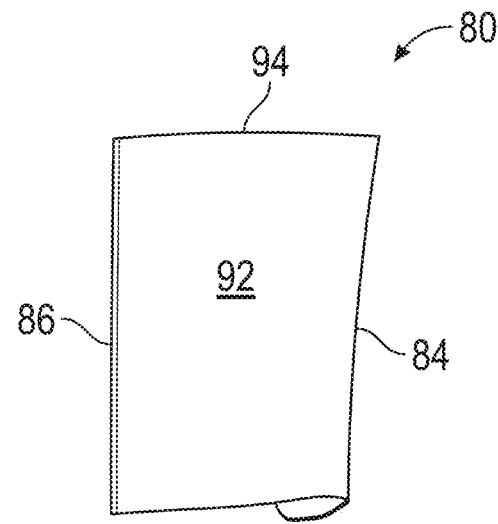
Figure 4C:
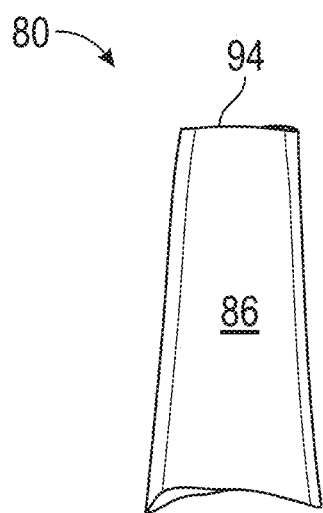
Figure 4D:
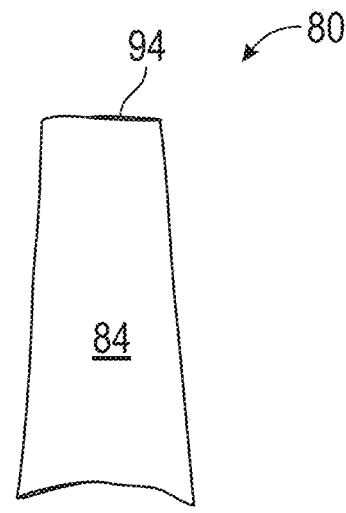

Referring to FIGS. 3A and 3B, the airfoil 80 somewhat schematically illustrates an exterior airfoil surface extending in a chord-wise direction C from the leading edge 84 to a trailing edge 86. The airfoil 80 is provided between pressure (concave) and suction (convex) sides 90, 92 in an airfoil thickness direction T, which is generally perpendicular to the chord-wise direction C. Multiple turbine blades 74 are arranged circumferentially in a circumferential direction Y. The airfoil 80 extends from the platform 82 in the radial direction R, or spanwise, to the tip 94. As mentioned above, the exterior airfoil surface may include multiple film cooling holes (not shown).

The exterior surface of the airfoil 80 generates lift based upon its geometry and direct flow along the core flow path C also illustrated by arrow 77 in FIG. 2. Various views of the airfoil 80 of the turbine blade 74 are shown in FIGS. 4A-4D. The turbine blades 74 are constructed from a high strength, heat resistant material such as a nickel-based or cobalt-based superalloy, or of a high temperature, stress resistant ceramic or composite material. In cooled configurations, internal fluid passages and external cooling apertures provide for a combination of impingement and film cooling. In addition, one or more thermal barrier coatings, abrasion-resistant coatings or other protective coatings may be applied to the turbine blade 74.

The geometry of airfoil 80 is described in terms of Cartesian coordinates referring to points on an exterior surface of the airfoil 80 defined along X, Y and Z axes, which respectively correspond to the axial (X), circumferential (Y) and radial (Z or R) directions shown in at least FIGS. 3A and 3B. In the below tables (Tables 1-3), the X and Y dimensions refer to the distance of each point along an exterior surface of the airfoil in one of three sections of the airfoil in the X and Y directions respectively with respect to a local point of origin for each of the Tables 1-3. In Tables 1-3 the local point of origin is at a forward most location or a leading edge 84 of each section of the airfoil. In Table 1 the axial (X) and circumferential (Y) locations are normalized by a local chord at the ¼ span (See FIG. 5) and the local point of origin is illustrated by reference numeral 100 in FIG. 5. The local chord being a local axial chord at the indicated span location, wherein the local axial chord corresponds to a width of the airfoil between the leading and trailing edges at the indicated span location. In Table 2 the axial (X) and circumferential (Y) locations are normalized by a local chord at the ½ span (See FIG. 5) and the local point of origin is illustrated by reference numeral 102 in FIG. 5. Again, the local chord being a local axial chord at the indicated span location, wherein the local axial chord corresponds to a width of the airfoil between the leading and trailing edges at the indicated span location. In Table 3 the axial (X) and circumferential (Y) locations are normalized by a local chord at the ¾ span (See FIG. 5) and the local point of origin is illustrated by reference numeral 104 in FIG. 5. Again, the local chord being a local axial chord at the indicated span location, wherein the local axial chord corresponds to a width of the airfoil between the leading and trailing edges at the indicated span location.

In addition and to provide the exterior airfoil surface at the aforementioned span locations (¼, ½ and ¾), each of these local points of origin (100, 102, 104) are offset in the axial (X), circumferential (Y) and radial (Z or R) directions from a point of origin O on the turbine blade 74. These offsets are illustrated in Table 4 and the point of origin O is defined by reference numeral 106 in FIGS. 3 and 5.

In one embodiment and as illustrated in FIG. 3, the point of origin 106 is located at a center point of an inner diameter edge of a forward root face of the root, root tree or root portion 96. The X and Y coordinates for the sections illustrated in at least FIG. 5 and the values in Tables 1-3 are normalized by a local axial chord at the indicated span locations (¼, ½, ¾) such that the axial coordinate (X) is scaled by the local axial chord at the indicated span location and the circumferential coordinate (Y) is scaled by the local axial chord at the indicated span location, wherein the local axial chord corresponds to a width of the airfoil between the leading and trailing edges at the indicated span location.

Figure 5:
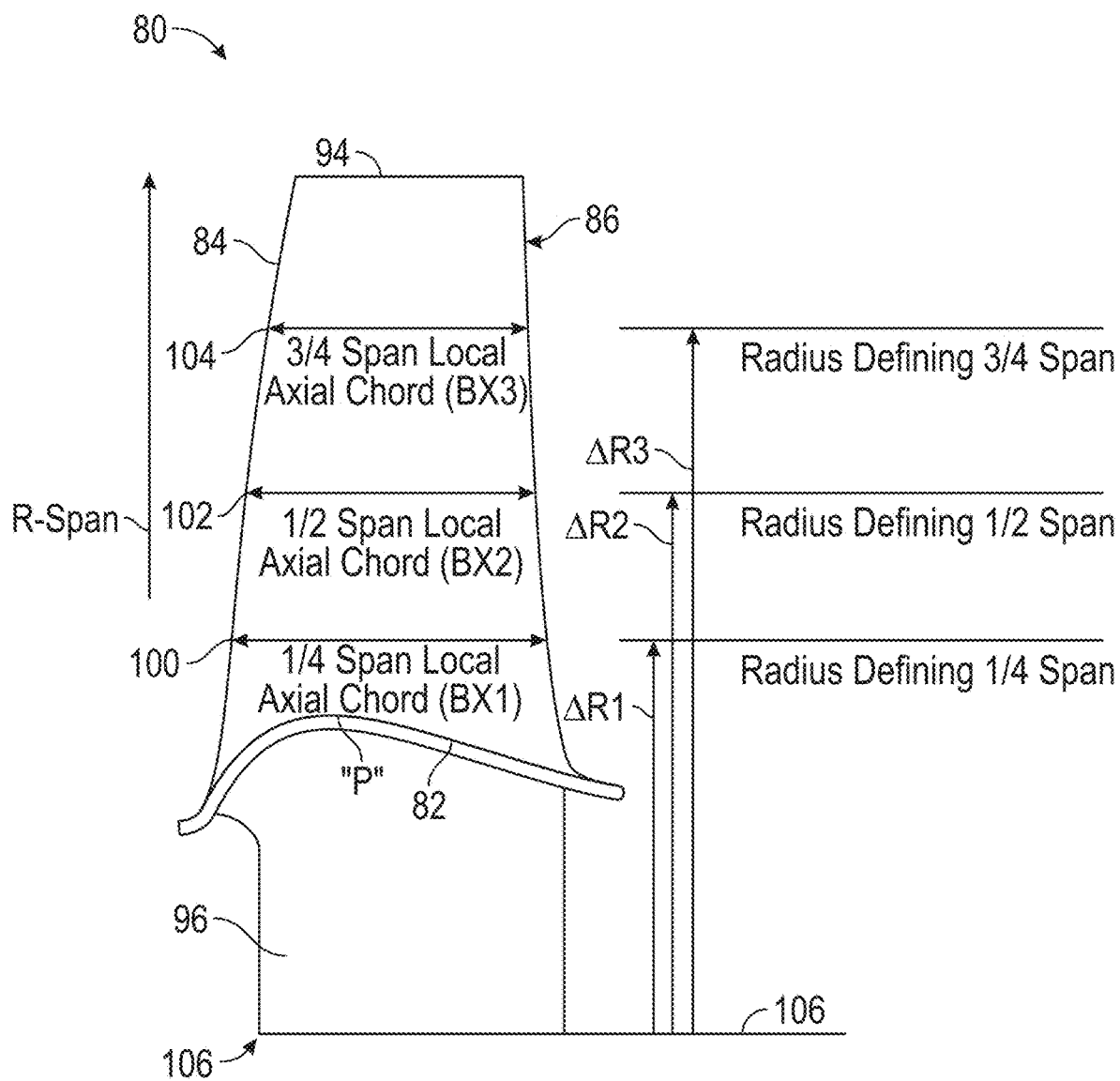
FIG. 5 depict the span positions and local axial chords referenced in Table 1.

The span coordinate is provided as a radial distance (ΔR1-ΔR3 in FIG. 5) from the point of Origin O or 106. In FIG. 5 a line is extended from the point of origin 106. The "0" span is taken at a point P where the airfoil 80 meets the platform 82, as schematically illustrated in FIG. 5. It being understood that only one point P is illustrated in FIG. 5. The overall span is the distance from the point P towards the tip 94 in the radial direction R or along the Z axis. By way of example, the "¼ span" is 25% the distance from the point P toward the tip 94 in the radial direction R or along the Z axis and "½ span" is 50% the distance from the point P toward the tip 94 in the radial direction R or along the Z axis and "¾ span" is 75% the distance from the point P toward the tip 94 in the radial direction R or along the Z axis. In one example, ΔR1 corresponds to the ¼ span and is 1.662 inches (4.221 cm) from the point of origin 106, ΔR2 corresponds to the ½ span and is 2.046 inches (5.197 cm) from the point of origin 106, and ΔR3 corresponds to the ¾ span and is 2.429 inches (6.170 cm) from the point of origin 106.

The axial (X) and circumferential (Y) coordinates are normalized by the local axial chord (Bx) for the given span location (Bx1-Bx3), as shown in FIG. 5. By way of example, local axial chord (Bx1) for axial (X) and circumferential (Y) coordinates associated with the ¼ span corresponds to the width of the airfoil 80 between the leading and trailing edges 84, 86 at the ¼ span location. In addition, the local axial chord (Bx2) for axial (X) and circumferential (Y) coordinates associated with the ½ span corresponds to the width of the airfoil 80 between the leading and trailing edges 84, 86 at the ½ span location and the local axial chord (Bx3) for axial (X) and circumferential (Y) coordinates associated with the ¾ span corresponds to the width of the airfoil 80 between the leading and trailing edges 84, 86 at the ¾ span location.

The contour of the airfoil 80 is set forth in Tables 1-3, which provides the axial (X) and circumferential (Y) coordinates of the contour of the airfoil 80. The axial (X), circumferential (Y) coordinates provided by Tables 1-3 are scaled by a local axial chord at corresponding span location (e.g., ¼, ½ and ¾). In addition and as mentioned above, each of the local points of origin for Tables 1-3 are offset in the axial (X), circumferential (Y) and radial (Z or R) directions from the point of origin 106 on the root 96 of the turbine blade 74. These offsets are illustrated in Table 4 and the point of origin O is defined by reference numeral 106 in FIGS. 3 and 5. The offsets illustrated in Table 4 are in inches and can be converted to metric (mm) by multiplying by 25.4.

In yet another non-limiting embodiment, the coordinates may have a true position tolerance of up to ±0.020 inches (±0.508 mm) due to manufacturing and assembly tolerances. Three dimensional airfoil surfaces are formed by joining adjacent points in Tables 1-3, as offset by Table 4, in a smooth manner and joining adjacent sections or sectional profiles along the indicated span. The set of Cartesian coordinates in Tables 1-3 include an axial coordinate scaled by a local axial chord at an indicated span location (e.g., ¼, ½, and ¾) and a circumferential coordinate scaled by the local axial chord at the indicated span location, wherein the local axial chord corresponds to a width of the airfoil between the leading and trailing edges at the indicated span location. The coordinates define points on a cold, uncoated, stationary airfoil surface, in a plane at the indicated span. Additional elements such as cooling holes, protective coatings, fillets and seal structures may also be formed onto the specified airfoil surface, or onto an adjacent platform surface, but these elements are not necessarily described by the normalized coordinates. For example, a variable coating may be applied between 0.0001 inch (0.003 mm) (trace) and 0.010 inch (0.25 mm) thick.

TABLE 1

Exterior airfoil coordinates at the ¼ span with reference to the local point of origin 100 at the forward most location or leading edge at the ¼ span of the airfoil normalized or scaled by the local axial chord (Bx1) for axial (X) and circumferential (Y) coordinates associated with the ¼ span, wherein the local axial chord corresponds to the width of the airfoil 80 between the leading and trailing edges 84, 86 at the ¼ span location.

| X | Y |
|---|---|
| 0.0000 | 0.0000 |
| 0.0000 | 0.0021 |
| 0.0001 | 0.0041 |
| 0.0002 | 0.0083 |
| 0.0004 | 0.0124 |
| 0.0009 | 0.0186 |
| 0.0019 | 0.0268 |
| 0.0038 | 0.0369 |
| 0.0076 | 0.0509 |
| 0.0141 | 0.0684 |
| 0.0247 | 0.0885 |
| 0.0407 | 0.1102 |
| 0.0633 | 0.1314 |
| 0.0929 | 0.1504 |
| 0.1287 | 0.1665 |
| 0.1703 | 0.1784 |
| 0.2175 | 0.1832 |
| 0.2686 | 0.1786 |
| 0.3200 | 0.1638 |
| 0.3719 | 0.1390 |
| 0.4215 | 0.1061 |
| 0.4671 | 0.0678 |
| 0.5105 | 0.0241 |
| 0.5506 | −0.0227 |
| 0.5877 | −0.0719 |
| 0.6219 | −0.1231 |
| 0.6537 | −0.1759 |
| 0.6831 | −0.2300 |
| 0.7103 | −0.2852 |
| 0.7358 | −0.3413 |
| 0.7596 | −0.3981 |
| 0.7819 | −0.4555 |
| 0.8029 | −0.5133 |
| 0.8229 | −0.5716 |
| 0.8418 | −0.6302 |
| 0.8598 | −0.6891 |
| 0.8765 | −0.7462 |
| 0.8925 | −0.8036 |
| 0.9074 | −0.8591 |
| 0.9207 | −0.9108 |
| 0.9331 | −0.9606 |
| 0.9445 | −1.0064 |
| 0.9552 | −1.0482 |
| 0.9653 | −1.0859 |
| 0.9743 | −1.1197 |
| 0.9820 | −1.1495 |
| 0.9883 | −1.1754 |
| 0.9935 | −1.1975 |
| 0.9975 | −1.2155 |
| 1.0000 | −1.2296 |
| 0.9987 | −1.2398 |
| 0.9951 | −1.2471 |
| 0.9911 | −1.2517 |
| 0.9879 | −1.2542 |
| 0.9843 | −1.2562 |
| 0.9825 | −1.2571 |
| 0.9806 | −1.2579 |
| 0.9791 | −1.2584 |
| 0.9775 | −1.2588 |
| 0.9743 | −1.2594 |
| 0.9711 | −1.2597 |
| 0.9662 | −1.2593 |
| 0.9601 | −1.2572 |
| 0.9533 | −1.2527 |
| 0.9458 | −1.2441 |
| 0.9391 | −1.2310 |
| 0.9314 | −1.2148 |
| 0.9224 | −1.1956 |
| 0.9122 | −1.1733 |
| 0.9009 | −1.1480 |
| 0.8878 | −1.1199 |
| 0.8725 | −1.0892 |
| 0.8549 | −1.0560 |
| 0.8352 | −1.0202 |
| 0.8145 | −0.9832 |
| 0.7918 | −0.9435 |
| 0.7678 | −0.9027 |
| 0.7433 | −0.8622 |
| 0.7175 | −0.8206 |
| 0.6911 | −0.7793 |
| 0.6642 | −0.7384 |
| 0.6367 | −0.6978 |
| 0.6086 | −0.6577 |
| 0.5799 | −0.6181 |
| 0.5505 | −0.5789 |
| 0.5204 | −0.5402 |
| 0.4896 | −0.5021 |
| 0.4581 | −0.4646 |
| 0.4258 | −0.4278 |
| 0.3927 | −0.3918 |
| 0.3587 | −0.3566 |
| 0.3237 | −0.3223 |
| 0.2890 | −0.2901 |
| 0.2533 | −0.2591 |
| 0.2179 | −0.2303 |
| 0.1840 | −0.2048 |
| 0.1506 | −0.1814 |
| 0.1191 | −0.1611 |
| 0.0894 | −0.1440 |
| 0.0634 | −0.1272 |
| 0.0429 | −0.1086 |
| 0.0278 | −0.0894 |
| 0.0171 | −0.0711 |
| 0.0099 | −0.0545 |
| 0.0055 | −0.0405 |
| 0.0029 | −0.0293 |
| 0.0016 | −0.0212 |
| 0.0008 | −0.0147 |
| 0.0004 | −0.0098 |
| 0.0002 | −0.0066 |
| 0.0001 | −0.0033 |
| 0.0001 | −0.0016 |
| 0.0000 | 0.0000 |

TABLE 2

Exterior airfoil coordinates at the ½ span with reference to the local point of origin 102 at the forward most location or leading edge at the ½ span of the airfoil normalized or scaled by the local axial chord (Bx2) for axial (X) and circumferential (Y) coordinates associated with the ½ span, wherein the local axial chord corresponds to the width of the airfoil 80 between the leading and trailing edges 84, 86 at the ½ span location.

| X | Y |
|---|---|
| 0.0000 | 0.0000 |
| 0.0004 | 0.0074 |
| 0.0009 | 0.0129 |
| 0.0013 | 0.0165 |
| 0.0019 | 0.0202 |

TABLE 2-continued

Exterior airfoil coordinates at the ½ span with reference to the local point of origin 102 at the forward most location or leading edge at the ½ span of the airfoil normalized or scaled by the local axial chord (Bx2) for axial (X) and circumferential (Y) coordinates associated with the ½ span, wherein the local axial chord corresponds to the width of the airfoil 80 between the leading and trailing edges 84, 86 at the ½ span location.

| X | Y |
| --- | --- |
| 0.0021 | 0.0220 |
| 0.0024 | 0.0239 |
| 0.0028 | 0.0259 |
| 0.0033 | 0.0281 |
| 0.0042 | 0.0324 |
| 0.0052 | 0.0366 |
| 0.0069 | 0.0430 |
| 0.0096 | 0.0513 |
| 0.0137 | 0.0614 |
| 0.0204 | 0.0752 |
| 0.0309 | 0.0918 |
| 0.0463 | 0.1103 |
| 0.0678 | 0.1290 |
| 0.0961 | 0.1455 |
| 0.1313 | 0.1570 |
| 0.1725 | 0.1615 |
| 0.2181 | 0.1577 |
| 0.2663 | 0.1442 |
| 0.3155 | 0.1210 |
| 0.3628 | 0.0899 |
| 0.4095 | 0.0508 |
| 0.4538 | 0.0059 |
| 0.4945 | −0.0423 |
| 0.5331 | −0.0949 |
| 0.5687 | −0.1496 |
| 0.6016 | −0.2059 |
| 0.6322 | −0.2636 |
| 0.6606 | −0.3223 |
| 0.6872 | −0.3819 |
| 0.7122 | −0.4421 |
| 0.7358 | −0.5029 |
| 0.7582 | −0.5642 |
| 0.7794 | −0.6259 |
| 0.7997 | −0.6879 |
| 0.8191 | −0.7502 |
| 0.8377 | −0.8128 |
| 0.8556 | −0.8755 |
| 0.8723 | −0.9363 |
| 0.8884 | −0.9973 |
| 0.9036 | −1.0563 |
| 0.9172 | −1.1112 |
| 0.9300 | −1.1641 |
| 0.9418 | −1.2127 |
| 0.9530 | −1.2570 |
| 0.9635 | −1.2970 |
| 0.9731 | −1.3327 |
| 0.9812 | −1.3644 |
| 0.9879 | −1.3918 |
| 0.9934 | −1.4152 |
| 0.9976 | −1.4343 |
| 1.0000 | −1.4493 |
| 0.9983 | −1.4600 |
| 0.9944 | −1.4677 |
| 0.9901 | −1.4726 |
| 0.9866 | −1.4751 |
| 0.9829 | −1.4773 |
| 0.9809 | −1.4782 |
| 0.9789 | −1.4791 |
| 0.9772 | −1.4796 |
| 0.9754 | −1.4801 |
| 0.9718 | −1.4808 |
| 0.9682 | −1.4811 |
| 0.9627 | −1.4806 |
| 0.9558 | −1.4782 |
| 0.9483 | −1.4729 |
| 0.9402 | −1.4630 |
| 0.9326 | −1.4483 |
| 0.9239 | −1.4301 |

TABLE 2-continued

Exterior airfoil coordinates at the ½ span with reference to the local point of origin 102 at the forward most location or leading edge at the ½ span of the airfoil normalized or scaled by the local axial chord (Bx2) for axial (X) and circumferential (Y) coordinates associated with the ½ span, wherein the local axial chord corresponds to the width of the airfoil 80 between the leading and trailing edges 84, 86 at the ½ span location.

| X | Y |
| --- | --- |
| 0.9137 | −1.4085 |
| 0.9023 | −1.3834 |
| 0.8896 | −1.3548 |
| 0.8751 | −1.3230 |
| 0.8585 | −1.2882 |
| 0.8395 | −1.2504 |
| 0.8187 | −1.2094 |
| 0.7970 | −1.1668 |
| 0.7736 | −1.1210 |
| 0.7492 | −1.0736 |
| 0.7248 | −1.0262 |
| 0.6994 | −0.9772 |
| 0.6738 | −0.9283 |
| 0.6482 | −0.8795 |
| 0.6223 | −0.8308 |
| 0.5963 | −0.7822 |
| 0.5699 | −0.7337 |
| 0.5433 | −0.6854 |
| 0.5162 | −0.6373 |
| 0.4886 | −0.5895 |
| 0.4604 | −0.5422 |
| 0.4312 | −0.4953 |
| 0.4008 | −0.4494 |
| 0.3687 | −0.4045 |
| 0.3346 | −0.3611 |
| 0.2995 | −0.3210 |
| 0.2620 | −0.2832 |
| 0.2236 | −0.2490 |
| 0.1863 | −0.2191 |
| 0.1493 | −0.1919 |
| 0.1145 | −0.1679 |
| 0.0820 | −0.1470 |
| 0.0540 | −0.1262 |
| 0.0329 | −0.1033 |
| 0.0182 | −0.0800 |
| 0.0088 | −0.0580 |
| 0.0035 | −0.0385 |
| 0.0009 | −0.0221 |
| 0.0000 | −0.0092 |
| 0.0000 | 0.0000 |

TABLE 3

Exterior airfoil coordinates at the ¾ span with reference to the local point of origin 104 at the forward most location or leading edge at the ¾ span of the airfoil normalized or scaled by the local axial chord (Bx3) for axial (X) and circumferential (Y) coordinates associated with the ¾ span, wherein the local axial chord corresponds to the width of the airfoil 80 between the leading and trailing edges 84, 86 at the ¾ span location.

| X | Y |
| --- | --- |
| 0.0000 | 0.0000 |
| 0.0000 | 0.0079 |
| 0.0004 | 0.0138 |
| 0.0007 | 0.0178 |
| 0.0011 | 0.0217 |
| 0.0013 | 0.0237 |
| 0.0016 | 0.0257 |
| 0.0019 | 0.0279 |
| 0.0023 | 0.0302 |
| 0.0032 | 0.0347 |

TABLE 3-continued

Exterior airfoil coordinates at the ¾ span with reference to the local point of origin 104 at the forward most location or leading edge at the ¾ span of the airfoil normalized or scaled by the local axial chord (Bx3) for axial (X) and circumferential (Y) coordinates associated with the ¾ span, wherein the local axial chord corresponds to the width of the airfoil 80 between the leading and trailing edges 84, 86 at the ¾ span location.

| X | Y |
|---|---|
| 0.0042 | 0.0393 |
| 0.0059 | 0.0460 |
| 0.0087 | 0.0549 |
| 0.0129 | 0.0657 |
| 0.0202 | 0.0802 |
| 0.0317 | 0.0977 |
| 0.0488 | 0.1166 |
| 0.0726 | 0.1353 |
| 0.1038 | 0.1505 |
| 0.1424 | 0.1582 |
| 0.1862 | 0.1549 |
| 0.2324 | 0.1403 |
| 0.2793 | 0.1153 |
| 0.3258 | 0.0813 |
| 0.3701 | 0.0408 |
| 0.4136 | −0.0068 |
| 0.4547 | −0.0595 |
| 0.4923 | −0.1148 |
| 0.5281 | −0.1739 |
| 0.5613 | −0.2346 |
| 0.5923 | −0.2964 |
| 0.6213 | −0.3592 |
| 0.6487 | −0.4227 |
| 0.6747 | −0.4868 |
| 0.6994 | −0.5514 |
| 0.7230 | −0.6165 |
| 0.7456 | −0.6819 |
| 0.7672 | −0.7476 |
| 0.7881 | −0.8136 |
| 0.8081 | −0.8799 |
| 0.8275 | −0.9463 |
| 0.8463 | −1.0130 |
| 0.8639 | −1.0776 |
| 0.8810 | −1.1423 |
| 0.8971 | −1.2050 |
| 0.9116 | −1.2632 |
| 0.9252 | −1.3194 |
| 0.9378 | −1.3710 |
| 0.9497 | −1.4181 |
| 0.9609 | −1.4605 |
| 0.9711 | −1.4985 |
| 0.9798 | −1.5320 |
| 0.9870 | −1.5612 |
| 0.9930 | −1.5859 |
| 0.9975 | −1.6062 |
| 1.0000 | −1.6222 |
| 0.9980 | −1.6335 |
| 0.9938 | −1.6417 |
| 0.9891 | −1.6469 |
| 0.9854 | −1.6496 |
| 0.9814 | −1.6519 |
| 0.9793 | −1.6529 |
| 0.9772 | −1.6538 |
| 0.9753 | −1.6543 |
| 0.9734 | −1.6548 |
| 0.9695 | −1.6556 |
| 0.9656 | −1.6560 |
| 0.9597 | −1.6554 |
| 0.9523 | −1.6529 |
| 0.9441 | −1.6474 |
| 0.9352 | −1.6369 |
| 0.9268 | −1.6213 |
| 0.9172 | −1.6018 |
| 0.9060 | −1.5787 |
| 0.8936 | −1.5518 |
| 0.8800 | −1.5212 |
| 0.8646 | −1.4870 |
| 0.8470 | −1.4495 |

TABLE 3-continued

Exterior airfoil coordinates at the ¾ span with reference to the local point of origin 104 at the forward most location or leading edge at the ¾ span of the airfoil normalized or scaled by the local axial chord (Bx3) for axial (X) and circumferential (Y) coordinates associated with the ¾ span, wherein the local axial chord corresponds to the width of the airfoil 80 between the leading and trailing edges 84, 86 at the ¾ span location.

| X | Y |
|---|---|
| 0.8268 | −1.4088 |
| 0.8046 | −1.3648 |
| 0.7816 | −1.3189 |
| 0.7568 | −1.2696 |
| 0.7312 | −1.2185 |
| 0.7055 | −1.1674 |
| 0.6788 | −1.1145 |
| 0.6521 | −1.0617 |
| 0.6252 | −1.0090 |
| 0.5983 | −0.9563 |
| 0.5712 | −0.9037 |
| 0.5439 | −0.8512 |
| 0.5164 | −0.7988 |
| 0.4886 | −0.7466 |
| 0.4606 | −0.6945 |
| 0.4321 | −0.6426 |
| 0.4032 | −0.5910 |
| 0.3737 | −0.5397 |
| 0.3436 | −0.4888 |
| 0.3127 | −0.4383 |
| 0.2819 | −0.3901 |
| 0.2501 | −0.3426 |
| 0.2183 | −0.2975 |
| 0.1875 | −0.2566 |
| 0.1566 | −0.2182 |
| 0.1268 | −0.1840 |
| 0.0983 | −0.1540 |
| 0.0710 | −0.1282 |
| 0.0462 | −0.1057 |
| 0.0268 | −0.0834 |
| 0.0143 | −0.0611 |
| 0.0066 | −0.0408 |
| 0.0024 | −0.0236 |
| 0.0005 | −0.0099 |
| 0.0000 | 0.0000 |

TABLE 4

Offsets (axial, circumferential and radial) provided in inches for each of the local points of origin 100, 102, 104 for Tables 1-3 relative to the point of origin 106 at the root tree leading edge.

|  | ΔX | ΔY | ΔR or ΔZ |
|---|---|---|---|
| ¼ Span | 0.2612 | 0.2199 | 1.6617 |
| ½ Span | 0.2867 | 0.2795 | 2.0455 |
| ¾ Span | 0.3263 | 0.3247 | 2.4293 |

In an alternative embodiment, the offsets for ΔX and ΔY at the ½ Span and the ¾ Span may be in the range of 0.2000-0.4000 inches. These offsets are provided in Table 5 below.

TABLE 5

Offsets (axial, circumferential and radial) provided in inches for each of the local points of origin 100, 102, 104 for Tables 1-3 relative to the point of origin 106 at the root tree leading edge.

|  | ΔX | ΔY | ΔR or ΔZ |
|---|---|---|---|
| ¼ Span | 0.2612 | 0.2199 | 1.6617 |
| ½ Span | 0.2000-0.4000 | 0.2000-0.4000 | 2.0455 |
| ¾ Span | 0.2000-0.4000 | 0.2000-0.4000 | 2.4293 |

In general, the turbine blade airfoil 80, as described herein, has a combination of axial sweep and tangential lean. Depending on configuration, the lean and sweep angles sometimes vary by up to ±10° or more. In addition, the turbine blade 74 is sometimes rotated with respect to a radial axis or a normal to the platform or shroud surface, for example by up to ±10° or more.

Novel aspects of the turbine blade and associated airfoil surfaces described herein are achieved by substantial conformance to specified geometries. Substantial conformance generally includes or may include the aforementioned manufacturing tolerance of about ±0.020 inches (±0.508 mm), in order to account for variations in molding, cutting, shaping, surface finishing and other manufacturing processes, and to accommodate variability in coating thicknesses. This tolerance is generally constant or not scalable, and applies to each of the specified blade surfaces, regardless of size.

Substantial conformance is based on sets of points representing a three-dimensional surface with particular physical dimensions, for example in inches or millimeters, as determined by selecting particular values of the scaling parameters. A substantially conforming airfoil, or turbine blade has surfaces that conform to the specified sets of points, within the specified tolerance.

The X and Y coordinates for the sections illustrated in at least FIG. 5 and the values in Tables 1-3 are from a local point of origin 100, 102 and 104 which is at a forward most location or a leading edge of each section (¼ span, ½ span and ¾ span) of the airfoil of the turbine blade 74. In addition, each of the X and Y coordinates for the sections illustrated in at least FIG. 5 and the values in Tables 1-3 are scaled by a corresponding local axial chord. Each of the offsets of Table 4 are distances given in inches from a point of origin O, which is defined by reference numeral 106 in FIG. 3. As mentioned above, the point of origin O is located at a center point of an inner diameter edge of a forward root face of the root, root tree or root portion 96.

It is, of course, understood that other units of dimensions may be used for the dimensions in Table 4 As mentioned above, the X, Y and (Z or R) values mentioned above may in one embodiment have in average a manufacturing tolerance of about ±0.020 inches (±0.508 mm) due to manufacturing and assembly tolerances. In yet another embodiment, the X, Y and (Z or R) values mentioned above may in average a manufacturing tolerance of about ±0.050 inches (±1.270 mm) due to manufacturing and assembly tolerances. It is, of course, understood that values or ranges greater or less than the aforementioned tolerance are considered to be within the scope of various embodiments of the present disclosure.

Substantial conformance with the coordinates of Tables 1-4 is based on points representing the section locations as determined by selecting particular values or scaling parameters. A substantially conforming blade has an airfoil that conforms to the specified sets of points, within the specified tolerance.

Alternatively, substantial conformance is based on a determination by a national or international regulatory body, for example in a part certification or part manufacture approval (PMA) process for the Federal Aviation Administration, Transport Canada, the European Aviation Safety Agency, the Civil Aviation Administration of China, the Japan Civil Aviation Bureau, or the Russian Federal Agency for Air Transport. In these configurations, substantial conformance encompasses a determination that a particular part or structure is identical to, or sufficiently similar to, the specified blade, or that the part or structure is sufficiently the same with respect to a part design in a type-certified or type-certificated blade, such that the part or structure complies with airworthiness standards applicable to the specified blade. In particular, substantial conformance encompasses any regulatory determination that a particular part or structure is sufficiently similar to, identical to, or the same as a specified blade, such that certification or authorization for use is based at least in part on the determination of similarity.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A turbine blade for a gas turbine engine, comprising:
an airfoil including leading and trailing edges joined by spaced apart pressure and suction sides to provide an exterior airfoil surface extending from a platform in a radial direction to a tip; and
wherein a portion of the exterior airfoil surface is formed in conformance with a set of Cartesian coordinates set forth in at least one of Tables 1-3, and wherein the set of Cartesian coordinates in Tables 1-3 are offset from a center point of an inner diameter edge of a forward root face of a root of the turbine blade by offsets of Table 4 to provide the portion of the exterior airfoil surface at a span location and the set of Cartesian coordinates in Tables 1-3 have a tolerance of ±0.020 inches.

2. The turbine blade of claim 1, further comprising a root, wherein the platform, the root, and the airfoil are cast as a single part.

3. The turbine blade of claim 1, wherein the portion of the exterior airfoil surface is formed in conformance with the set of Cartesian coordinates set forth in Tables 1 and 2.

4. The turbine blade of claim 1, wherein the at least one of Tables 1-3 comprises Tables 1 and 3.

5. The turbine blade of claim 1, wherein the at least one of Tables 1-3 comprises Tables 2 and 3.

6. The turbine blade of claim 1, wherein the at least one of Tables 1-3 comprises Tables 1-3.

7. A turbine rotor assembly for a gas turbine engine, comprising:
   a rotor disk;
   a plurality of turbine blades secured to the rotor disk, each of the plurality of turbine blades having an airfoil including leading and trailing edges joined by spaced apart pressure and suction sides to provide an exterior airfoil surface extending from a platform in a radial direction to a tip; and
   wherein a portion of the exterior airfoil surface is formed in conformance with a set of Cartesian coordinates set forth in at least one of Tables 1-3, and wherein the set of Cartesian coordinates in Tables 1-3 are offset from a center point of an inner diameter edge of a forward root face of a root of the turbine blade by offsets of Table 4 to provide the portion of the exterior airfoil surface at a span location and the set of Cartesian coordinates in Tables 1-3 have a tolerance of ±0.020 inches.

8. The turbine rotor assembly of claim 7, wherein each of the plurality of turbine blades further comprise a root, wherein the platform, the root, and the airfoil are cast as a single part.

9. The turbine rotor assembly of claim 7, wherein the at least one of Tables 1-3 comprises Tables 1-3.

10. A gas turbine engine comprising:
    a compressor section;
    a combustor fluidly connected to the compressor section;
    a turbine section fluidly connected to the combustor, the turbine section comprising:
      a high pressure turbine coupled to a high pressure compressor of the compressor section via a shaft;
      a low pressure turbine; and
      wherein the high pressure turbine includes a turbine rotor assembly comprising;
        a rotor disk;
        a plurality of turbine blades secured to the rotor disk, each of the plurality of turbine blades having an airfoil including leading and trailing edges joined by spaced apart pressure and suction sides to provide an exterior airfoil surface extending from a platform in a radial direction to a tip; and
        wherein a portion of the exterior airfoil surface is formed in conformance with a set of Cartesian coordinates set forth in at least one of Tables 1-3 and wherein the set of Cartesian coordinates in Tables 1-3 are offset from a center point of an inner diameter edge of a forward root face of a root of the turbine blade by offsets of Table 4 to provide the portion of the exterior airfoil surface at a span location and the set of Cartesian coordinates in Tables 1-3 have a tolerance of ±0.020 inches.

11. The gas turbine engine of claim 10, wherein each of the plurality of turbine blades further comprise a root, wherein the platform, the root, and the airfoil are cast as a single part.

12. The gas turbine engine of claim 10, wherein the at least one of Tables 1-3 comprises Tables 1-3.

* * * * *